(12) United States Patent
Bet Esh

(10) Patent No.: US 8,750,003 B2
(45) Date of Patent: Jun. 10, 2014

(54) DEVICE AND METHOD FOR DC TO AC CONVERSION

(76) Inventor: Shlomo Ran Bet Esh, Jerusalem (IL)

( * ) Notice: Subject to any disclaimer, the term of this patent is extended or adjusted under 35 U.S.C. 154(b) by 215 days.

(21) Appl. No.: 13/161,516

(22) Filed: Jun. 16, 2011

(65) Prior Publication Data

US 2012/0320644 A1    Dec. 20, 2012

(51) Int. Cl.
*H02M 7/497* (2007.01)
(52) U.S. Cl.
USPC .................. 363/97; 363/63; 323/906
(58) Field of Classification Search
CPC  H02M 7/497; H02M 7/53862; H02M 7/5395
USPC ............. 363/63, 40, 41, 95, 97, 131; 323/906
See application file for complete search history.

(56) References Cited

U.S. PATENT DOCUMENTS

| | | | | |
|---|---|---|---|---|
| 5,917,721 A | * | 6/1999 | Kerkman et al. | 363/98 |
| 6,570,779 B2 | * | 5/2003 | Shimazaki et al. | 363/41 |
| 2008/0012539 A1 | * | 1/2008 | Stanley | 323/222 |
| 2008/0304301 A1 | * | 12/2008 | Nishio et al. | 363/132 |

* cited by examiner

*Primary Examiner* — Harry Behm
(74) *Attorney, Agent, or Firm* — Deborah Gador

(57) ABSTRACT

The present invention provides a DC to AC converter including a device enabling separation of electric current into a positive portion of the circuit and a negative portion of the circuit, each portion of the circuit including an electronic switch, wherein one portion of the circuit is adapted to produce a wave form in a positive half cycle, the second portion of the circuit is adapted to produce a wave form in a negative half cycle, the voltage of the output current is fed to a polarity switch as feedback to change the polarity, and wherein the carrier duty cycle is adapted to change from 0 to 100 percent in each polarity.

8 Claims, 2 Drawing Sheets

DEVICE AND METHOD FOR DC TO AC CONVERSION

FIELD OF THE INVENTION

The present invention relates generally to methods and systems for DC to AC conversion and more specifically to methods and apparatus for DC to AC conversion for electrical appliances.

BACKGROUND OF THE INVENTION

Over the past few decades there has been a significant increase in the number of new systems for conversion of solar energy and/or wind energy into electricity. Many such systems first a) convert the solar/wind energy into DC electricity and thereafter b) convert the DC electricity into AC electricity for feeding into an AC power grid and for any other needs, such as UPS, CARS, etc.

A regular prior art P.W.M converter works in this way, for example: for zero output level, the duty cycle is 50%—half the time it is charging and half the time it is discharging, which causes a waste of energy.

A capacitor is charged and discharged all the time, at the frequency of the modulator switching carrier wave, to produce 50 or 60 Hertz sinusoidal output wave voltage, for example, to create a zero output frequency level in a regular PWM 50 percent high without, and 50 percent low load and the switching losses are relatively high in a regular P.W.M or PM modulation.

The second disadvantage of the prior art is the cross conductivity, when one switch is on and the other is not yet completely off. The prior art solution is a dead time and is also reducing the efficiency.

Some patent publications in the field include:

U.S. Pat. No. 4,488,057 describes a power supply for a load such as a computer, which is sensitive to power interruptions. A switching regulator is coupled to both the AC power line and a rechargeable battery, and makes automatic transitions between AC operation and battery operation, utilizing a transistor switch and an energy storage transformer coupled to both power sources and to the load. The transistor switch is driven by a variable duty cycle control signal provided by a programmed current feedback circuit responsive to both output voltage and instantaneous switch current. The feedback circuit cuts off the switch each time the peak current through the switch reaches a value corresponding to the desired output voltage, thus improving control-loop stability and maintaining a constant peak current through the switch to substantially eliminate ripple. The circuit enables one terminal of the battery to be connected to one terminal of the switching transistor, to minimize noise. A charging circuit recharges the battery whenever the AC power line is operating within normal limits.

U.S. Pat. No. 4,560,886 discloses an alternating current power source which controls its own alternating current output through a feedback circuit which monitors the alternating current output. The power source can be used as a backup to a primary power supply which provides power to a load. The invention described in this patent includes embodiments with dual independent source circuits which continuously monitor such primary power supply to detect power interruptions in the primary power supply. When an interruption is detected, monitoring logic circuitry of the alternating current power source disconnects the primary power supply from the load and energizes line driver circuitry of the present invention which provides the alternating current output. When the power interruption ceases, the monitoring logic circuitry reconnects the primary power supply to the load and disables the line driver circuitry so that alternating current is not provided by the present invention to the load. The alternating current power source includes an internal power supply which can be recharged through the line driver circuitry by the primary power supply when there is no power interruption in the primary power supply.

U.S. Pat. No. 4,728,808A describes an uninterruptible power supply system having input terminals connectable to an AC power source and leading to an AC to DC converter for producing a first DC voltage source and a second DC voltage source operationally connected to the first source. The system supplying at the output of the second source a voltage normally primarily is provided by the first DC source. A capacitive accumulator device connected in parallel with a voltage sensing and controlling circuit and with the output of the two DC sources. The sensing and controlling circuit controls the output of at least the second of the DC voltage sources so as to provide at the output terminals of the system a substantially constant output voltage also when the AC power source to which the system is connected is interrupted.

Some of the problems associated with these systems include:

a) These systems have energetic power losses due to working in both charging and discharging capacitor simultaneously and continuously;

b) These systems work with two inductor coils in series and between them there may be formed a cross-conductivity leading to further energetic power losses and loss of reliability.

There is thus still a need to provide systems and methods which overcome the aforementioned problems.

SUMMARY OF THE INVENTION

It is an object of some aspects of the present invention to provide improved methods and systems for conversion of renewable energy (solar, wind, hydroelectric, wave motion, others, or combinations thereof) to AC electricity, and improved and DC to AC UPS devices.

In further embodiments of the present invention, a device for DC to AC conversion is provided which is constructed and configured to enable a high duty cycle (as compared with prior art pulse width modulation (PWM) or PM modes). During modulation, the combination of two transistors creates an AC electrical source, where one portion of the circuit, including the first transistor, creates the positive half cycle, and the other portion of the circuit, including the second transistor, creates the negative half cycle. This arrangement enables provision of relatively higher duty cycle supply relative to prior art PWM modes. In the devices according to the present invention, the two portions of the circuit work separately, thereby eliminating cross conductivity at high frequencies.

The device of the present invention decreases the current peaks, thereby reducing heat losses due to $I^2R$ and reducing switching power losses. The device can change the path of the current, if necessary, by means of an output sensitive switch for switching the polarity of the DC input, which forms a waveform on a reactive load by changing the polarity instantaneously between the positive half cycle and the negative one, through the polarity switch, which forces the gate of Q2 by driver A during operation of Q1 cycle. This combination within the device forces the output to follow the input reference, which constitutes a major part of the present invention.

The device according to the present invention includes:

a) a positive portion of a circuit including: a positive DC supply fed through an input terminal and connected to an electronic switch and thereafter to an inductor and to an output accumulator capacitor; and b) a negative portion of a circuit including: a negative DC supply fed through an input terminal and connected to an electronic switch and thereafter to the same or a separate inductor and to an output accumulator capacitor.

These switches are activated alternately by a signal processing unit and a power driver, the polarity determined by the output load feedback and switches in a single polarity track. When the low side or the minus cycle begins, the switch in the positive portion of the circuit closes and the second switch in the negative portion of the circuit feeds from the negative terminal starts working and creates the negative half cycle, every portion of the circuit working independently. If the load is purely resistive and changes direction in stages when the output is a reactive load, the flexible switch reacts and changes polarity to force an output wave form on any kind of load to follow the input reference signal.

The switch is activated by a signal processing unit and a power driver. When the polarity of the waveform on the output load drops beyond a certain value, determined by the polarity of the feedback waveform on the output load feedback, the polarity switch switches the polarity.

The advantage of the embodiment with P.W.M. or P.M. (pulse modulation) DC to AC converter of the present invention and the design is to make it more efficient and reliable. Thus, there is load feedback which feeds the polarity switch, measures the load on the capacitor at the AC output terminal, which is configured to charge and discharge at a rate of the carrier frequency, independent of the point in the cycle, no matter if it's the higher half cycle or the lower.

In order to take advantage of separation of the cycle into a positive high cycle and a negative high cycle, it is necessary to have a switch which sends a signal to change the polarity under pre-determined conditions or threshold. The switch senses the voltage on the load and includes a comparator of output relative to a reference, having a predefined threshold for changing the polarity. It will be appreciated that this arrangement is particularly useful with loads that are not ohmic. The arrangement of the present invention prevents distortion due to changes in operating current and works more efficiently than conventional devices under non-ohmic loads.

At the high side, one path of the circuit works alone, in order to charge the capacitor, and to increase the output voltage and charging it in the opposite direction on the negative cycle or if the load does not discharge fast.

One of the embodiments of the present invention provides a flexible polarity control switch. This switch changes its polarity according to the load classification in order to force the output flow by the input reference signal.

There is thus provided according to an embodiment of the present invention, an DC to AC converter including a device enabling separation of electric current into a positive portion of the circuit and a negative portion of the circuit, each circuit portion includes an electronics switch, whereby one portion of the circuit produces a wave form in a positive half cycle and wherein the carrier duty cycle can change from 0 to 100 percent in each polarity.

Furthermore, according to an embodiment of the present invention, the DC to AC includes a full bridge with separation between portions of the circuit and polarity flexible switches.

Moreover, according to an embodiment of the present invention, the converter is constructed to correct frequency pulses and variable width.

Furthermore, according to an embodiment of the invention, the polarity switch alternatingly activates said first and second circuit portions in order to conserve energy in case of a reactive load and to feed a corrective sine wave form to the load.

Additionally, according to an embodiment of the present invention, the two portions of the circuit are configured to operate independently.

Moreover, according to an embodiment of the present invention, the two portions of the circuit are configured to substantially eliminate cross-conductivity.

Furthermore, according to an embodiment of the present invention the cross-conductivity electrical circuits are configured to be synchronized with the output load by a polarity output sense unit.

There is thus provided according to the present invention a Direct Current to Alternating Current (DC to AC) converter including a circuit receiving direct current, the circuit including a positive portion producing a wave form in a positive half cycle and a negative portion producing a wave form in a negative half cycle to provide output alternating current, the positive portion and the negative portion each including an electronic switch, and a polarity switch for closing one of the electronic switches according to a pre-determined threshold to energize alternately the positive portion of the circuit and the negative portion of the circuit, the voltage of the output current being fed to the polarity switch as feedback to change the polarity, wherein the carrier duty cycle may change from 0 to 100 percent in each polarity.

According to some embodiments of the invention, the converter further includes a single inductor coupled to positive portion and to said negative portion.

According to alternative embodiments, the converter further includes two inductors, one coupled to the positive portion and one coupled to the negative portion.

According to other embodiments, the DC to AC converter further includes a load in the circuit and the feedback voltage is correlated to characteristics of the load.

According to further embodiments, the converter further includes a Mono polar P.W.M generator which is fed control signals by said polarity switch and which generates a pulse wave corresponding to the control signals.

Further according to these embodiments, the converter may include a driver drivingly coupled to each of the switches, the generator being coupled to the drivers for activating and deactivating the drivers.

There is also provided, according to the invention, a method for converting direct current to alternating current. The method includes producing a wave form in a positive half cycle in a positive portion of a circuit; producing a wave form in a negative half cycle in a negative portion of the circuit to provide output alternating current; and alternatingly activating the positive portion of the circuit and the negative portion of the circuit according to feedback output voltage according to a pre-determined threshold; wherein the carrier duty cycle may change from 0 to 100 percent in each polarity.

According to some embodiments, the step of alternatingly activating includes generating pulse waveforms; modulating the pulse waveforms with control signals corresponding to the feedback output voltage; and feeding the modulated pulse waveforms to a driver to produce the waveform in the positive or negative half cycle.

BRIEF DESCRIPTION OF THE DRAWINGS

The present invention will be more fully understood from the following detailed description of the preferred embodiments thereof, taken together with the drawings.

The invention will now be described in connection with certain preferred embodiments with reference to the following illustrative figures so that it may be more fully understood.

Figure 1:
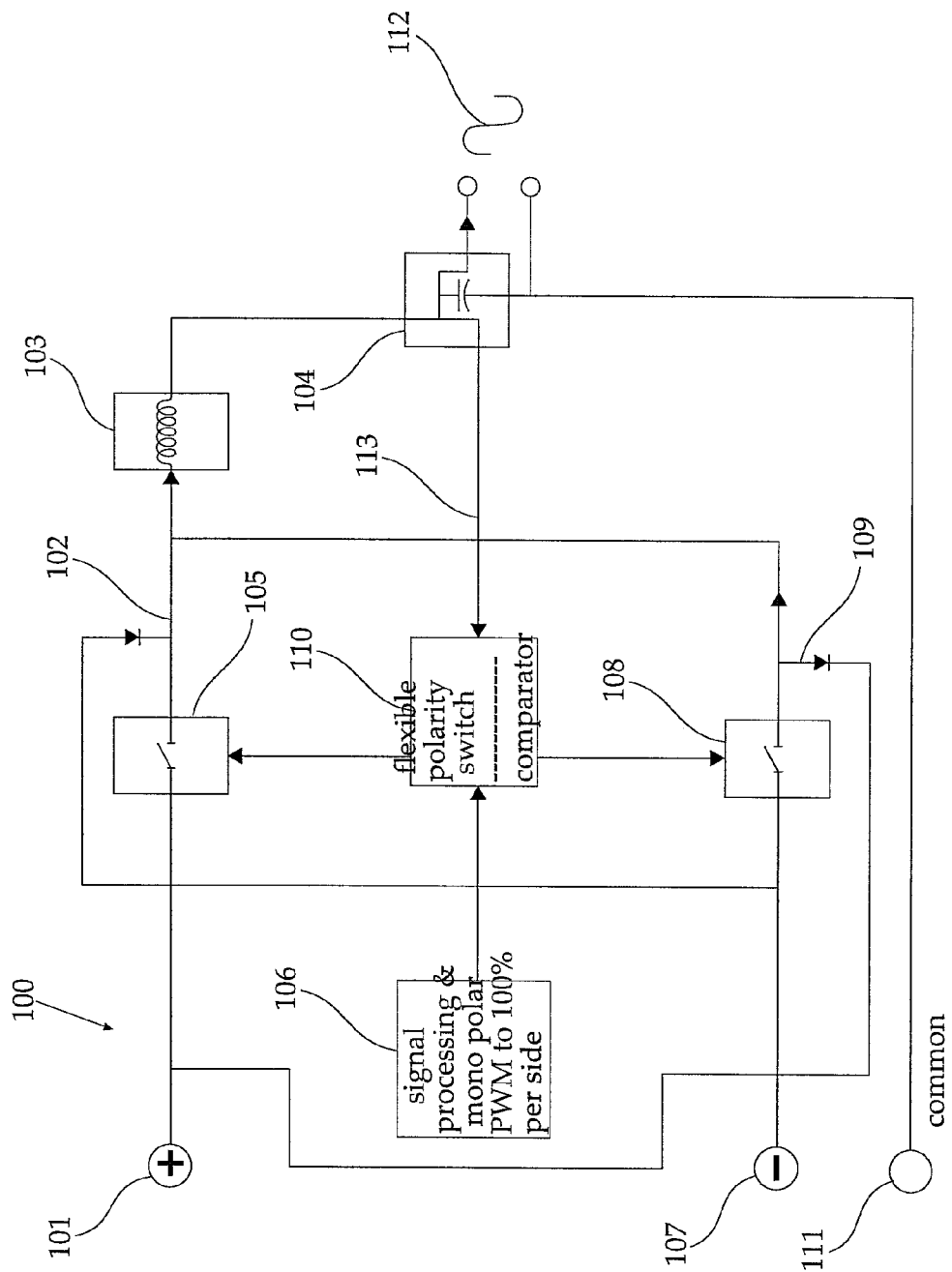

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 2:
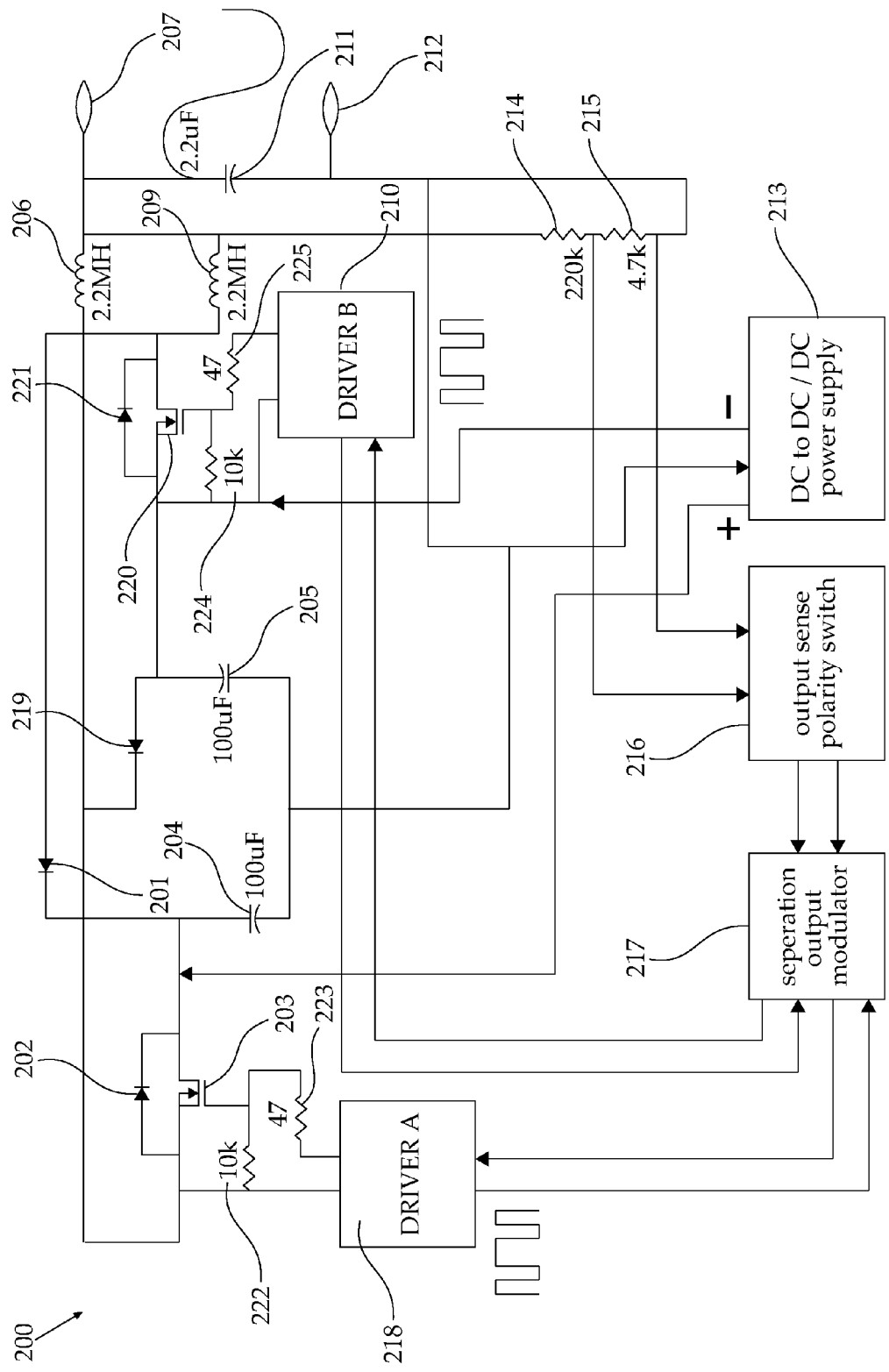

In the drawings:

FIG. 1 is a simplified pictorial illustration showing a system comprising one inductor coil for converting DC to AC, in accordance with an embodiment of the present invention; and FIG. 2 is a simplified detailed pictorial illustration showing a system comprising two inductor coils for converting DC to AC, including optocoupler-isolated drivers, a separation output modulator, and a polarity switch, in accordance with an embodiment of the present invention.

In all the figures similar reference numerals identify similar parts.

DETAILED DESCRIPTION OF PREFERRED EMBODIMENTS

In the detailed description, numerous specific details are set forth in order to provide a thorough understanding of the invention. However, it will be understood by those skilled in the art that these are specific embodiments and that the present invention may be practiced also in different ways that embodiment the characterizing features of the invention as described and claimed herein.

The present invention relates to a DC to AC converter circuit having a reactive portion [inductor coil and capacitor] charged from two different directions—positive from positive portion then when it receives feedback beyond a predefined threshold, the polarity switch closes the negative portion of the circuit and opens the positive portion of the circuit, so now the reactive portion is charged from the negative portion of the circuit.

Reference is now made to FIG. 1, which is a simplified pictorial illustration showing a system 100 comprising one inductor coil 103 for converting DC input 101, 107, preferably received from a renewable energy source, in reference to the ground 111, to AC output 112. An output feedback 113 is fed to switches 108, 105 of a pulse gate through a polarity switch 110.

Two electrical circuits feed the coil 103 and are separated by two diodes 102, 109, in order to prevent a short circuit, or simultaneous operation, in accordance with an embodiment of the present invention.

FIG. 2 is a simplified detailed pictorial illustration showing a system 200 comprising two inductor coils 206, 209 for converting DC input (DC power supply) 213 to AC output 207, 212, a pair of optocoupler isolated drivers 218, 210, which push two MOSFET gates 203, 220, or any other bipolar isolated gates, with a power magnification ratio calculated by proportion of the gate resistors 222, 223, 224, and 225.

Two diodes 202, 221, keep the MOSFET 203, 220 flowing in a direction from a drain to the source. The two electrical circuits that feed the different inductor coils 206, 209 are separated by the two diodes 201, 219, in order to prevent simultaneous operation.

The diode keeps total separation as long as the potential drop between the anode to the cathode will be held by the capacitors 204, 205, which improve the carrier pulse. The MOSFET 203, 220 drain voltage will unilaterally charge and discharge through the coils 206, 209, on the output capacitor 211. The output capacitor 211 feeds the resistors 214, 215. The polarity switch 216 senses the output voltage on the resistors and activates one side of the circuit, so as to determine the polarity of the output load current.

MODES FOR CARRYING OUT THE INVENTION

As can be seen in FIG. 1, DC sources 101, 107 feed a positive working current through the two separate paths 105, 108 of the polarity switch. The positive cycle mono-polar switching modulation creates the positive half cycle on the plus side, and the negative switch produces the negative half cycle on the minus side. These are combined in an output powerful wave cycle.

Part of the invention is the use of a polarity sensitive switch 110 which imposes output wave forms according to an input sample 106, whether the load is a reactive, inductive or capacitive load. One direction, during each polarity cycle, makes wider pulses wide duty cycle by the modulator 217 (FIG. 2), so the converter is very efficient. The cross-conductivity of the switches 203, 220 is completely eliminated since each of switches 203, 220 works independently, which gives the converter very high reliability and efficiency, as well.

There is, thus, no necessity to use narrow pulses to build a real output sine wave, which improves the efficiency.

Invention in detail, step by step

Step 1

According to FIG. 1, mono polar P.W.M generator 106 creates a positive or high side duty cycle by sending pulses to operate the switches 110, 108 at a desired pulse width.

The switch is a driver embodied by a field effect transistor or any other IGBT transistor, or electronic switch. The drain voltage charges through the coil 103 on the output integrator capacitor 112, in order to create the output high side half cycle.

Step 2

The output sensitive polarity switch 216 is fed the output alternating voltage and sends control signals to the Mono polar P.W.M generator 217 in FIG. 2. P.W.M. generator 217 generates a pulse wave corresponding to the control signals which activate and deactivate the drivers 218, 210. The negative side will be created by switch 220 which sends the negative side power pulses through the coil 206, in order to integrate the output lower half cycle of the sine wave. The diode 221 keeps the inductor L2 206 current.

Step 3

When the output at the positive half cycle or the negative half cycle, is not coordinated with the input reference voltage unit 216, the polarity switch will change the direction by the modulator unit 217 and cause the sine wave form to change polarity, back to the original direction.

The DC source 213 in the converter can be fed from batteries or solar panels or any other DC source.

The embodiment of this invention can use a bridge topology or half bridge, with the same output sensitive polarity switches.

The references cited herein teach many principles that are applicable to the present invention. Therefore the full contents of these publications are incorporated by reference herein where appropriate for teachings of additional or alternative details, features and/or technical background.

It should be understood that the invention is not limited in its application to the details set forth in the description contained herein or illustrated in the drawings. The invention is capable of other embodiments and of being practiced and carried out in various ways. Those skilled in the art will readily appreciate that various modifications and changes can be applied to the embodiments of the invention as hereinbefore described without departing from its scope, defined in and by the appended claims.

The invention claimed is:

1. A Direct Current to Alternating Current (DC to AC) converter comprising:
   a circuit having a positive portion and a negative portion;
   the positive portion, having a first driver, coupled to a source of positive DC voltage and producing a waveform in a positive half cycle and the negative portion, having a second driver, coupled to a source of negative DC voltage and producing a waveform in a negative half cycle;
   wherein said positive portion and said negative portion share a common output to provide alternating current at the common output,
   said positive portion and said negative portion each including an electronic switch for switching on and off the portion associated with that switch; and
   a polarity switch for closing one of said electronic switches according to a pre-determined threshold to switch on alternately said positive portion of said circuit and said negative portion of said circuit;
   the voltage of said output alternating current being fed as feedback to a comparator to control the polarity by switching on the appropriate switch; and
   wherein a carrier duty cycle may change from 0 to 100 percent in each half cycle; and
   further comprising two output inductors, one of said output inductors being coupled to said positive portion and the other of said output inductors being coupled to said negative portion.

2. The DC to AC converter according to claim 1, further comprising a single output inductor coupled to positive portion and to said negative portion.

3. The DC to AC converter according to claim 1, further comprising a load in said circuit, wherein said feedback voltage is correlated to characteristics of the load.

4. The DC to AC converter according to claim 1, further comprising a Mono polar P.W.M. generator which is fed control signals by said polarity switch and which generates a pulse wave corresponding to the control signals.

5. The DC to AC converter according to claim 4, wherein said generator is coupled to said drivers for activating and deactivating the drivers to switch on and switch off the switches.

6. A DC to AC converter according to claim 1, wherein said polarity switch controls a pulse width modulator, which is configured to operate electronic drivers.

7. A DC to AC converter according to claim 6, wherein said electronic drivers are electronic gates controlling charging and discharging of an output inductors and, hence, control a voltage across a load.

8. A DC to AC converter according to claim 7, wherein the electronic switches are MOSFET gates, adapted to discharge the drain energy at the negative cycle.

* * * * *